Dec. 17, 1935.  M. H. SINKS  2,024,482
AGITATING DEVICE
Filed June 9, 1933   2 Sheets-Sheet 1
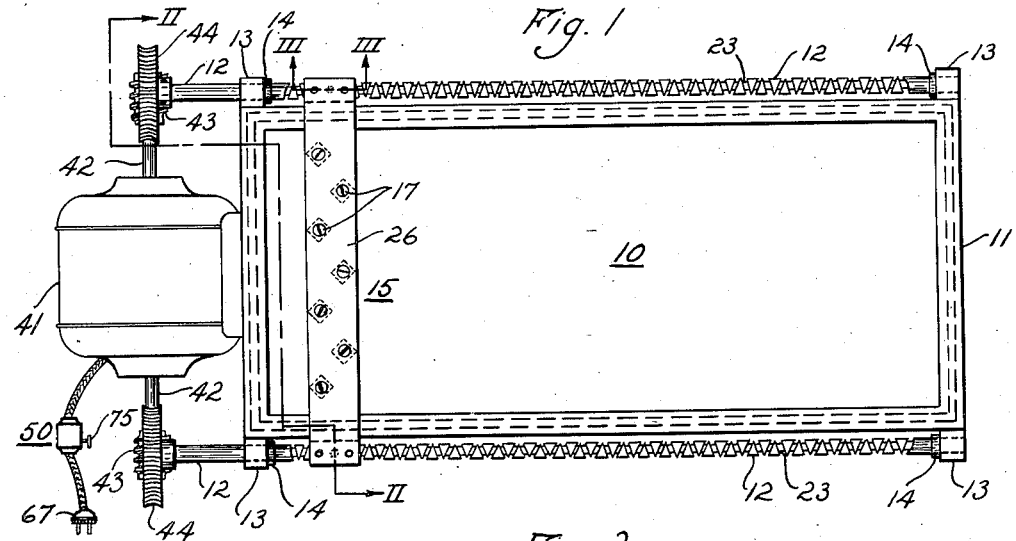
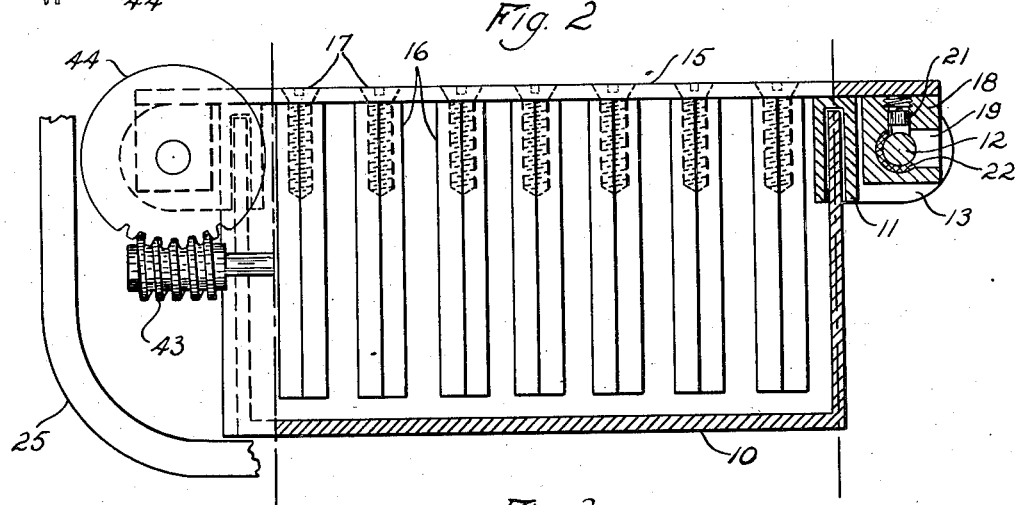
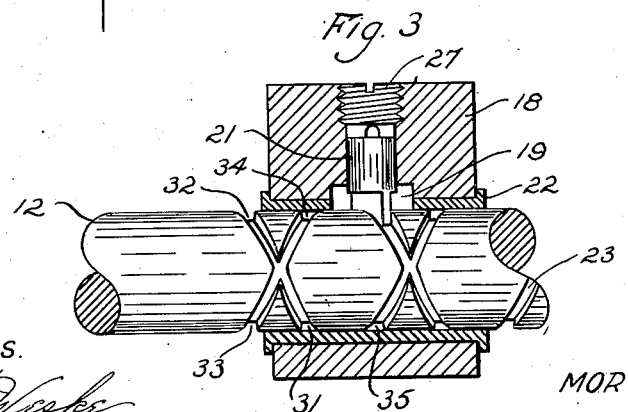
WITNESS.
INVENTOR.
MORTON H. SINKS
BY
George V. Woodling
ATTORNEY.

Dec. 17, 1935.  M. H. SINKS  2,024,482
AGITATING DEVICE
Filed June 9, 1933   2 Sheets-Sheet 2
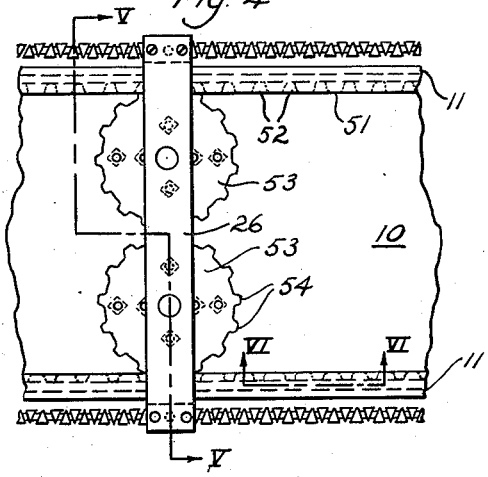
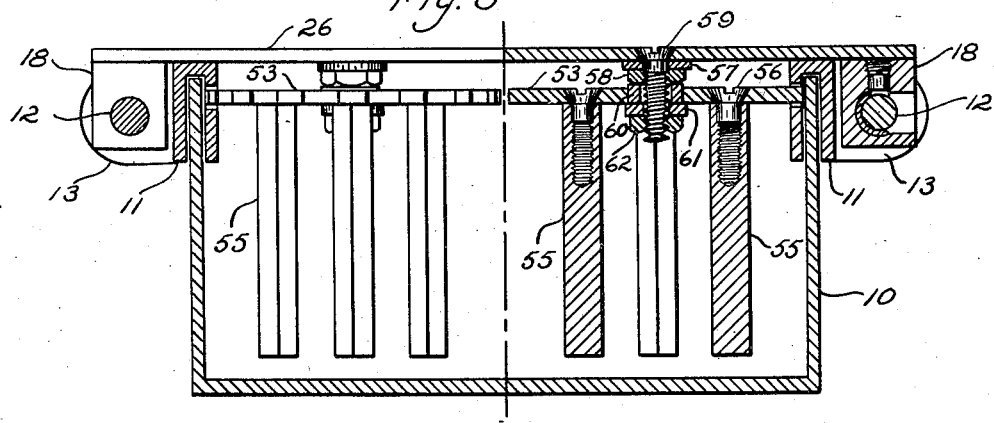
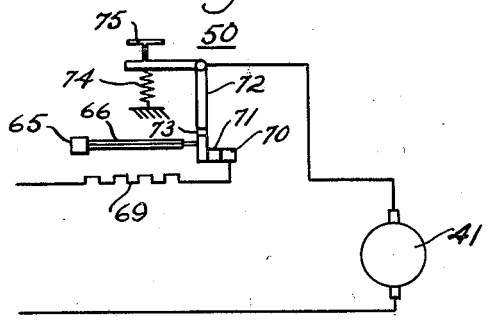
WITNESS.
INVENTOR.
MORTON H. SINKS
BY
George V. Woodling
ATTORNEY.

Patented Dec. 17, 1935

2,024,482

UNITED STATES PATENT OFFICE 2,024,482

AGITATING DEVICE

Morton H. Sinks, Cleveland, Ohio

Application June 9, 1933, Serial No. 675,042

1 Claim. (Cl. 259—113)

My invention relates generally to devices for stirring mixtures, and more particularly to a device that may be utilized in combination with a cooling unit of a refrigerator for stirring ice cream and other mixtures while freezing.

An object of my invention is to provide for stirring ice cream and other mixtures as they are being frozen in the cooling unit of a refrigerator.

Another object of my invention is the provision of a device that may be removably positioned in the cooling unit of a refrigerator for stirring ice cream and other mixtures. A still further object of my invention is to provide for reciprocating an agitator through ice cream or other mixtures as they are being frozen in the cooling unit of a refrigerator.

Another object of my invention is to provide for giving a compound movement to an agitator, partaking of both a reciprocating movement and a rotating movement, so that the ice cream or other mixtures are amply and thoroughly stirred as they are being frozen.

It is also an object of my invention to provide for discontinuing the stirring action when the ice cream or other mixture attains a certain degree of stiffness.

Other objects and a fuller understanding of my invention may be had by referring to the following description, taken in connection with the accompanying drawings, in which like parts are designated by like reference characters, and in which:

Figure 1 represents a plan view of an agitating device, embodying the features of my invention;

Figure 2 is an enlarged front end view, partly in section, of my agitating device, taken along the line II—II of Figure 1;

Figure 3 is an enlarged cross-sectional view of a traveling member, taken along the line III—III of Figure 1, and is shown in combination with a fragmentary view of a rotating shaft having an endless threaded groove provided thereon;

Figure 4 is a fragmentary plan view of a modified form of my agitating device, in which the agitator comprises two similarly constructed rotating parts;

Figure 5 is an enlarged cross-sectional view of the modified form of my agitating device, taken along the line V—V of Figure 4;

Figure 6 is an enlarged fragmentary view of a toothed rack, taken along the line VI—VI of Figure 4;

Figure 7 is a diagrammatic view of an overload switch which disconnects the motor from the supply source when the ice cream or other mixture attains a certain degree of stiffness.

With reference to Figures 1, 2 and 3 of the drawings, my agitating device comprises, in general, a rectangular shaped container 10, a support 11 that is adapted to engage the upper peripheral edge of the container 10, two rotating shafts 12 having an endless threaded groove 23, an agitator 15 that is disposed to be reciprocally actuated by the rotating shafts 12, and a motor 41 for simultaneously actuating the two rotating shafts 12;

The container 10 may be constructed of any suitable material, and may be of any suitable size, so long as it fits within the cooling unit of a refrigerator, of which a fragmentary portion is indicated by the reference character 25 of Figure 2. In this embodiment of my invention, the support 11 is provided with two depending spaced portions, thus constituting a relatively deep groove which engages the upper peripheral edge of the container 10. In this manner, the support 11 may be easily and freely mounted upon, or removed from, the container 10. Further, the co-operative engagement between the container 10 and the support 11 positively secures the support 11 from slipping or otherwise falling off the container 10, unless the container is turned upside down.

As illustrated, the corners of the support 11 are provided with lugs 13, which constitute bearings for the two rotating shafts 12 that reciprocally actuate the agitator 15. To prevent any axial movement of the shafts 12, I utilize collars 14 which may be suitably keyed to the shafts 12 and which slidably engage the inner face of the lugs 13.

Mounted upon each of the rotating shafts 12 is a traveling member 18, having a bearing sleeve 22 which slidably engages the rotating shaft 12. Within each of the traveling members 18 is a swiveled element 21 having a tongue for engaging the endless threaded grooves 23 of the rotating shafts. As illustrated, the swiveled element 21 may be secured in position by means of a threaded lug 27. By means of the co-operative action of the swiveled element 21, and the endless threaded groove 23 of the rotating shaft, the traveling members 18 are caused to travel simultaneously from one end of the threaded portion of the shaft to the other. With particular reference to Figure 3, the rotation of the shaft 12, one-half of a revolution in a clockwise direction, as viewed from the left-hand end, causes that portion of the threaded groove, indicated by the reference character 31 to assume a position under the tongue of the swiveled element 21, thus actuating the traveling member 18 to the left; a further clockwise rotation of the shaft 12, one-half of a revolution, causes that portion of the groove indicated by the reference character 32 to assume a position under the tongue of the swiveled element 21, thus further actuating the traveling member 18 to the left; a further clockwise rotation of the shaft 12, one-half of a revolution, causes that portion of the threaded groove indicated by the reference character 33 to assume a position under the tongue of the swiveled element 21; a further clockwise rotation of the shaft, one-half of a revolution, causes that portion of the threaded groove represented by the reference character 34 to assume a position under the tongue of the swiveled element 21 thus moving the traveling member 18 to the right; and a further clockwise rotation of the shaft 12, one-half of a revolution, causes that portion of the threaded grooves represented by the reference character 35 to assume a position under the tongue of the swiveled element 21, thus actuating the traveling member 18 further to the right. Hence, it is noted that during the above described rotation of the rotating shaft 12, the traveling member 18 first moves to the left and then to the right, the reversing taking place as that portion of the endless threaded groove which lies on the opposite side of the rotating shaft 12, as shown in Figure 3, and being that portion between the reference characters 32 and 33, moves past the tongue of the swiveled element 21. Therefore, the continuous rotation of the threaded shaft 12 causes the traveling members 18 to reciprocate simultaneously from one end of the threaded portion of the shaft to the other.

As illustrated in Figures 2 and 3, the traveling members 18 are provided with openings 19, thus exposing the tongue of the swiveled element 21, so that in case any frost is scraped out of the threaded groove 23, the frost may be ejected through the opening 19.

Bridging the two traveling members 18 is a cross-member 26, beneath which are positioned in a staggered relation, a plurality of square agitating members 16. As shown, these square agitating members 16 may be connected to the cross-member 26 by means of the illustrated screws 17, or any other suitable means. Thus, as the cross-member 26 is actuated from one end of the container to the other, the square agitating members 16 sweep through and thoroughly agitate the ice cream or other mixture in the container 10, as it is being frozen.

As a means for continuously rotating the shafts 12, I employ a suitable electric motor 41 having its base mounted against the front edge of the support 11. Extending from each side of the electric motor 41, is a shaft 42 upon which is mounted a worm 43 that meshes with a worm wheel 44 mounted on the left-hand ends of the two rotating shafts 12.

When making ice cream or other frozen mixtures, the prepared liquid that is to be frozen is poured into the container 10 after which the entire assembly is inserted within the cooling unit of the refrigerator, except possibly the motor, which may in some cases, depending upon the construction of the cooling unit, be partially exposed. When the agitating device is positioned in the cooling unit 25 of the refrigerator, the electric plug 67 may be plugged in a suitable socket provided inside of the box of a modern household refrigerator. Then, by depressing the push button of the overload switch 50, the motor 41 is energized, thus operating the agitator 15.

In this manner, the prepared liquid that is to be frozen into ice cream is continuously stirred as it is being frozen. As the ice cream attains a certain degree of stiffness, I find that in order to prevent heating of the motor it is advisable to disconnect it from the supply circuit. This may be done by utilizing the overload switch 50 connected in series circuit relation between the motor 41 and the electric plug 67. As diagrammatically illustrated in Figure 7, the overload switch 50 comprises a stationary contact 70, a movable contact 71 carried on the lower end of a swinging arm 72, a bimetallic strip 66 that holds the movable contact 71 against the stationary contact 70, and a heating element 69 for influencing the action of the bimetallic strip 66. The left-hand end of the bimetallic strip 66 is mounted upon a stationary member 65, and the free end of the bimetallic strip 66 is somewhat reduced, so that the reduced portion may slide into an opening 73 of the swinging arm 72, when the bimetallic element 66 swings upwardly, as a result of overheating from the heating element 69. Therefore, in actual operation, when the ice cream attains a certain degree of stiffness, the current drawn by the electric motor increases to a point, such that the heat generated by the heating element 69 causes the bimetallic strip 66 to deflect upwardly, in which case the reduced end of the bimetallic strip 66 enters the hole 73 and allows the spring 74 to bias the movable contact 71 from the stationary contact 70. The separation of the contacts, as is apparent, disconnects the motor 41 from the electric supply source. When the bimetallic element 66 is cooled, the switch 50 may be reclosed by depressing the push button 75, in which case the bimetallic element 66 again deflects downwardly and holds the movable contact 71 against the stationary contact 70.

With reference to Figures 4, 5 and 6, I illustrate a modified form of my agitating device. In this modified form, the agitator comprises two revolving sprockets 53 beneath which are mounted a plurality of square agitating elements 55. The teeth of the sprockets 53 are designed to mesh into a toothed rack 51 provided on the inner surface of the support 11. As shown best in Figure 6, the toothed rack 51 is formed by providing equally spaced apertures 52 along the inner surface of the support 11.

The sprockets 53 may be suitably mounted beneath the cross-plate 26. As illustrated in the cross-section of Figure 5, the mounting comprises a screw 59, upon which is first inserted a washer 57, then a nut 58, then a sleeve 60, then a second washer 61, and then a second nut 62. In this assembly the sprockets 53 are revolubly mounted around the sleeves 60 as a bearing surface, and are constrained vertically between the nut 58 and the washer 61. This mounting gives a very stable support to the revolving agitating sprockets. In the operation of this modified form of my agitator, the sprockets are constrained to rotate, as the cross member 26 is actuated from one end of the container 10 to the other. The composite stirring action of the modified form of my agitator is such that the stirring action partakes both of a reciprocating motion and a rotating motion, thus providing a structure for giving a good stirring action to the ice cream or other mixture.

In both forms of my invention, the combined mechanical advantage of the rotating shafts 12 and the worm 43 and the worm wheel 44 is very great, so that the motor 41 may be relatively small, and still stir the ice cream to a point that it becomes relatively stiff before the overload switch 50 disconnects the motor 41 from the supply source. While not shown, the motor 41 and the worm 43 and the worm wheel 44 may be completely or partially enclosed to facilitate the handling and cleaning of my agitating device.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

The combination, with a cooling unit of a refrigerator, of a container in which ice cream or other mixtures may be cooled, said container being adapted for insertion within the cooling unit of the refrigerator, a support removably mounted upon the container, an agitator adapted to stir the ice cream or other mixture to be cooled, means for mounting the agitator upon the support, a toothed rack provided on the support, a rotating member having teeth that mesh with the toothed rack for rotating the agitator, driving means including endless screw means mounted longitudinally of, and on the outside of, the container for reciprocally operating the agitator whereby no lubricant or other material may drop in the container and whereby the agitating action partakes both of a reciprocating motion and a rotating motion, the arrangement of the support, the agitator, and the driving means being such that the entire agitating assembly may be removably mounted upon the container, so that when the ice cream or other mixtures are frozen the entire agitating assembly may be removed from the container in which case the container may be reinserted within the cooling unit of the refrigerator for further chilling of the ice cream or other mixtures.

MORTON H. SINKS.